United States Patent [19]

James

[11] Patent Number: 5,522,630
[45] Date of Patent: Jun. 4, 1996

[54] FISHING TOOL FOR MAGNETIC OBJECTS

[76] Inventor: Frank D. James, 285 Alliance St., Wenonah, N.J. 08090

[21] Appl. No.: 413,519

[22] Filed: Mar. 30, 1995

[51] Int. Cl.⁶ .................................................... B66C 1/06
[52] U.S. Cl. .................... 294/65.5; 254/134.3
[58] Field of Search ............... 294/65.5; 254/134.3 R, 254/134 FT; 335/290, 291, 293

[56] References Cited

U.S. PATENT DOCUMENTS

| | | | |
|---|---|---|---|
| 2,613,980 | 10/1952 | Hawkins | 294/65.5 |
| 2,654,627 | 10/1953 | Story | 294/65.5 |
| 3,078,073 | 2/1963 | Zizzo | 254/134.3 |
| 3,924,115 | 12/1975 | Hampton et al. | 294/65.5 |
| 3,971,543 | 7/1976 | Shanahan | 254/134.3 |
| 4,225,171 | 9/1980 | Hay, II et al. | 294/65.5 |
| 4,253,697 | 3/1981 | Acosta | 294/65.5 |
| 4,527,775 | 7/1985 | Flowers | 254/134.3 |
| 4,572,561 | 2/1986 | Hale | 294/65.5 |
| 5,261,714 | 11/1993 | Slusar et al. | 294/65.5 |

*Primary Examiner*—Dean Kramer
*Attorney, Agent, or Firm*—Norman E. Lehrer; Jeffrey S. Ginsberg

[57] ABSTRACT

A tool for fishing magnetic objects through a wall includes a body portion that has a cavity formed therein. An electromagnet is secured in the cavity and is connected to a variable power source that is adapted to selectively activate the electromagnet. A pair of lines are secured to the top of the body portion so that the same can be raised or lowered a predetermined distance. The body portion includes a slot that extends into the same from the top thereof. The slot is adapted to retain an end of a fish tape therein.

8 Claims, 2 Drawing Sheets

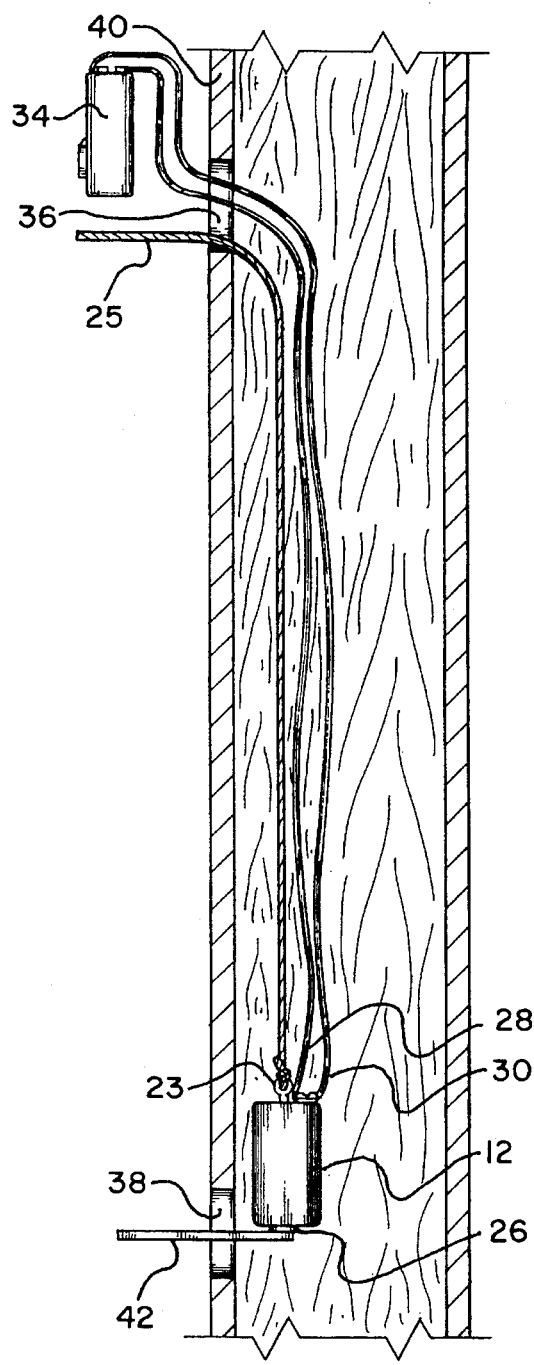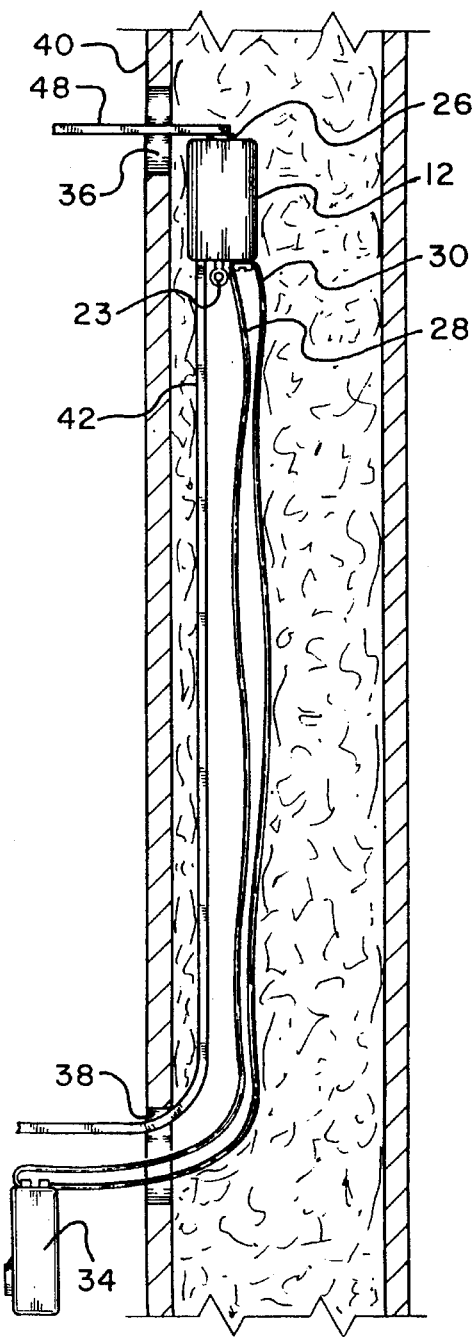

FISHING TOOL FOR MAGNETIC OBJECTS

BACKGROUND OF THE INVENTION

The present invention relates to a tool for use in fishing electrical wires through a wall and, more particularly, to such a tool that utilizes an electromagnet for selectively attracting magnetic objects such as fish tape.

Electricians and other installers of electrical fixtures and telephones in dwellings, offices and commercial buildings spend a significant amount of time running electrical conduit or wire through walls. The running of wire is necessary to establish the connection between a fixture and a corresponding power source. In some instances, a length of fish tape is first inserted through a hole in a wall and positioned adjacent a different hole some distance away. The wire to be installed is then secured to the one end of the fish tape. Thereafter, the other end of the tape is pulled through the wall so that the wire is drawn through the same.

It is often difficult to insert either the fish tape or electrical wire through one hole in a wall and manipulate the same so that one end of the tape or wire can be positioned adjacent another second hole. In recognition of the aforementioned problem, magnetic fishing tools have been developed that aid in the insertion of the fish tape and/or electrical wire through the wall.

U.S. Pat. No. 3,078,073, for example, discloses an electrical wire finder that includes a conductor holder and a sensor made of magnetizable material. In use, the conductor holder, with a conductor secured thereto, is inserted into a hole in a wall. Thereafter, the sensor is lowered from an area where the connecting cable or wire is located, via a flexible line, to the vicinity of the conductor holder. The conductor holder has a magnet secured thereto. Accordingly, the conductor holder and sensor are attracted to one another. The operator can then raise the flexible line to carry the conductor to the connecting cable in order to establish the required electrical connection.

A problem associated with this prior art device is that the conductor holder has a permanent magnet secured thereto. Accordingly, as it is inserted into the wall it attracts anything that is made of magnetic material. This interferes with the insertion and positioning of the conductor holder. Furthermore, since the line secured to the sensor is flexible, the sensor cannot be pushed upwardly through a wall. More specifically, if the holder and attached conductor are located adjacent a first hole positioned above a second hole, the sensor could not be inserted through the second hole and up toward the first hole because the line has no structural rigidity.

U.S. Pat. No. 3,971,543 discloses a tool for fishing electrical wires through walls that includes a magnetic sensor. One end of the sensor is connected to a length of chain while the other end has a fastener member which is secured to a line or wire. In use, a cylindrical member, which houses a permanent magnet therein, is inserted through a hole in the wall to attract the sensor assembly which is suspended within the wall. Once again, this device is only useful in allowing an operator to position the line or wire from an upper location to a lower location as the chain has no structural rigidity. Additionally, the magnet secured to the cylindrical housing cannot be selectively energized or deenergized.

U.S. Pat. Nos. 4,527,775 and 4,572,561 also disclose devices for installing wire or conduit. However, these devices are relatively complex and unwieldy.

SUMMARY OF THE INVENTION

The present invention is designed to overcome the deficiencies of the prior art discussed above. It is an object of this invention provide a fishing tool that facilitates the installation of wire or other conduit behind a wall.

It is a further object to provide a fishing tool that allows a mechanic to insert fish tape up a wall through insulation or similar material.

It yet another object of the invention to provide such a tool that includes an electromagnet which can be selectively activated and/or deactivated.

In accordance with the illustrative embodiments, demonstrating features and advantages of the present invention, there is provided a tool for fishing magnetic objects through a wall that includes a body portion that houses an electromagnet therein. The electromagnet is connected to a battery via a pair of wires so that the former can be selectively activated. In the preferred embodiment, the body portion has a slot for retaining an end of a fish tape therein. The body portion can be raised or lowered in a wall by the wires that connect the electromagnet to the battery, by a separate line secured to the body portion or by a fish tape secured in the body portion.

Other objects, features and advantages will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 4 is a side view showing the fishing tool inserted through a hole in a wall, and FIG. 5 is a view similar to FIG. 4 showing a fish tape secured in the body portion of the fishing tool.

DETAILED DESCRIPTION OF THE PREFERRED EMBODIMENT

Figure 1:
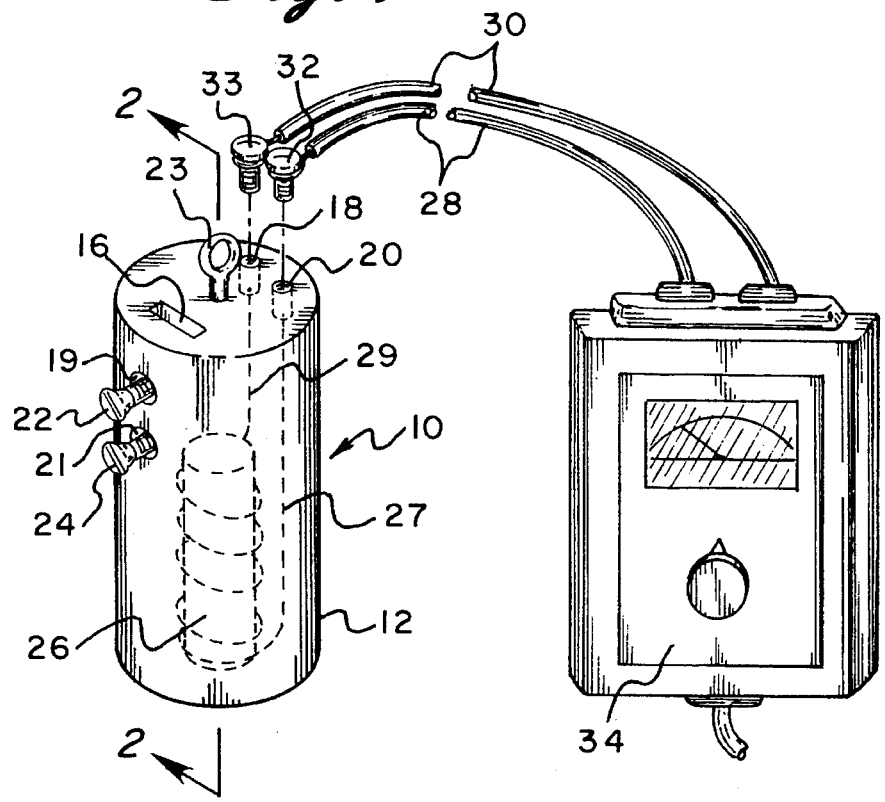
FIG. 1 is a top side perspective view of the present invention.

Referring now to the drawings in detail wherein like reference numerals have been used throughout the various figures to designate like elements, there is shown in FIG. 1 a tool for fishing magnetic objects through a wall constructed in accordance with the principles of the present invention and designated generally as 10.

Figure 2:
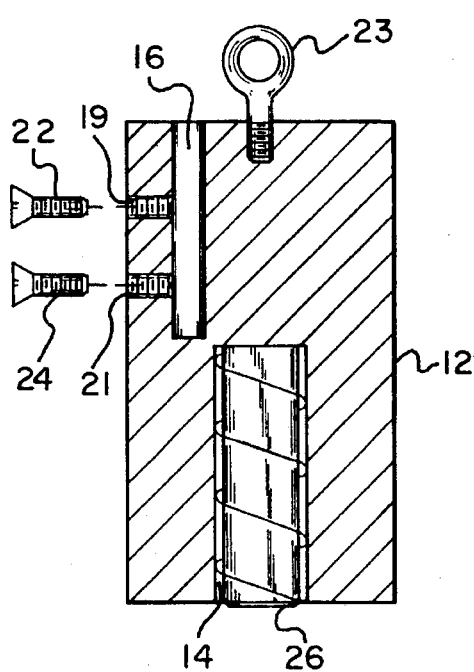
FIG. 2 is a cross-sectional view taken along lines 2—2 of FIG. 1.

The fishing tool 10 includes a body portion 12 having a cavity 14 formed in the bottom thereof (see FIG. 2). A slot 16 extends into the top of the body portion 12. The slot is preferably offset from the cavity 14. A pair of screw holes 18 and 20 extend into the top of the body portion 12. Extending into the side of the body portion 12 are set screw apertures 19 and 21 which receive set screws 22 and 24. In the preferred embodiment, the body portion 12 is cylindrically shaped. However, the body portion can be a variety of other shapes such as rectangular or bullet shaped. Body portion 12 preferably has a diameter of approximately ⅞" and is 2" long. It can be made of stainless steel, other high quality alloys or plastic. In the preferred embodiment, a ring member 23 is secured to the top of the body portion 12 (see FIG. 1). A length of string 25 or the like is preferably secured to the ring member 23 as shown in FIG. 4.

An electromagnet 26 is secured in the cavity 14. A pair of thin conductive lines 27 and 29 extend from the upper portion of the electromagnet. Each of the lines extends through the body portion and is positioned in a corresponding hole 18 and 20. Screws 32 and 33 provide terminals to connect the electromagnet 26 to a variable direct current battery or other power source 34 via a pair of wires 28 and 30 as illustrated in FIG. 1. More specifically, each wire 28 and 30 has one end secured around a corresponding screw 32 and 33. The wires must be of equal or greater length than the distance the fishing tool 10 must extend as more fully described below. The power supply 34 selectively energizes the electromagnet 26 when an activation switch, well known in the art, is triggered. A holder (not shown) made of metal or high impact plastic can be utilized to house the power source or battery. The holder would preferably include a belt clip and/or wrist strap for securement to the worker.

To facilitate an understanding of the principles associated with the foregoing apparatus, its operation will now be briefly described. Upper and a lower holes 36 and 38 are formed in a wall 40 as illustrated in FIG. 4. The body portion 12 of the fishing tool 10 is inserted through the upper hole 36 and is lowered downwardly toward the lower hole 38. During the insertion of the body portion, the electromagnet 26 secured therein is not energized. Once the electromagnet is in the vicinity of the lower hole 38, it is energized and the end of a fish tape 42 is inserted through the lower hole until it is adjacent the electromagnet 26. When the tape 42 approaches the electromagnet, it will be drawn thereto and this is sensed by the workman.

The fishing tool 10, together with the fish tape 42, is then pulled up through the wall toward the upper hole 36. This can be achieved by grasping the string 25 and pulling the same away from hole 36 until one end of the fish tape extends through the upper hole 36. The other end of the fish tape extends through the lower hole 38. Since the battery is preferably of the variable direct current type, the strength of the electromagnet can be increased or decreased as required. After an end of the fish tape 42 is drawn through the upper hole 36, a wire or other conduit is attached thereto. Thereafter, the end of the fish tape adjacent the lower hole 38 is pulled away from the wall so that the wire or other conduit is properly fished for subsequent electrical connection.

Figure 3:
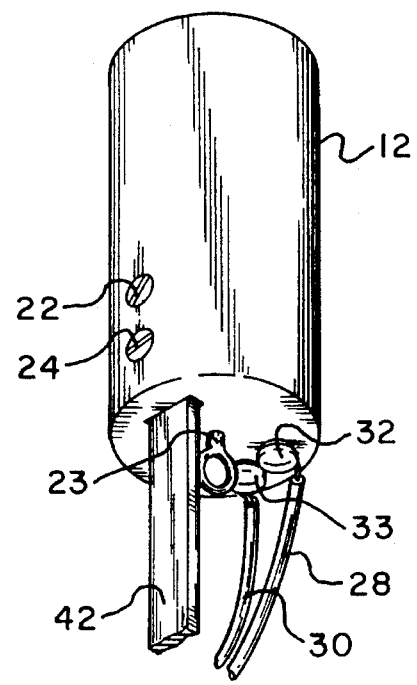
FIG. 3 is a perspective view of the inverted fishing tool of FIG. 1.

The fishing tool 10 can also be utilized to insert a length of wire or other conduit from a lower level to an upper level. This is achieved by first inserting the end of the fish tape 42 into the slot 16 in the upper portion of body portion 12 as shown in FIG. 3. The end of the fish tape is secured in the slot by the set screws 22 and 24 threaded into the screw apertures 19 and 21. Once the fish tape 42 is in place, the body portion 12 is inserted up through the lower hole 38 by grasping the fish tape and feeding it up along the wall (see FIG. 5). Since the fish tape 42 has some structural rigidity, the body portion can be fished up the wall until it is in the vicinity of the upper hole 36. Moreover, the rigidity of the fish tape allows it to pass through insulation material or other similar barriers as it travels up the wall.

Once the body portion 12 is in the vicinity of the upper hole 36, a second fish tape 48 or other magnetic material is inserted into the hole 36. Thereafter, the electromagnet is energized in the manner described above. The second fish tape 48 is then attracted to the electromagnet 26. Thereafter, the second fish tape 48 is pulled through and away from the upper hole 36 which in turn draws the body portion and the attached first fish tape 42 through the upper hole. This allows the operator to attach a wire to the first fish tape. Thus, when the end of the first fish tape 42 that extends from the lower hole 38 is pulled away from the wall, the other end, which is secured to the wire or other conduit to be fished, is drawn down the wall through the upper hole 36 and out the lower hole 38.

The present invention may be embodied in other specific forms without departing from the spirit or essential attributes thereof and accordingly reference should be made to the appended claims rather than to the foregoing specification as indicating the scope of the invention.

What is claimed is:

1. A tool for fishing magnetic objects through a wall comprising:

a body portion having a cavity formed therein and having a slot for receiving an end of a fish tape, said slot being offset from said cavity;

an electromagnet secured in said cavity in said body portion;

means for selectively activating said electromagnet, and line means secured to said body portion for lowering or raising said body portion a predetermined distance.

2. The fishing tool of claim 1 wherein said selectively activating means includes a variable power supply.

3. The fishing tool of claim 2 wherein said activating means further includes a switch means for selectively energizing said electromagnet.

4. The fishing tool of claim 1 further including means for securing said fish tape in said slot of said body portion.

5. The fishing tool of claim 4 wherein said securing means includes at least one screw hole formed in said body portion and being associated with said slot, and a screw threadably secured in said screw hole and being adapted to be threaded into or out said slot.

6. The fishing tool of claim 1 wherein said body portion further includes a fastener means for retaining a line thereon.

7. The fishing tool of claim 6 wherein said fastener means includes a ring member secured to said body portion.

8. A tool for fishing magnetic objects through a wall comprising:

a body portion having a cavity formed therein and having a slot for receiving an end of a fish tape;

means for securing said fish tape in said slot;

an electromagnet secured in said cavity in said body portion;

means for selectively activating said electromagnet, and line means secured to said body portion for lowering or raising said body portion a predetermined distance.

* * * * *